UNITED STATES PATENT OFFICE.

MARK W. MARSDEN, OF PHILADELPHIA, PENNSYLVANIA, ASSIGNOR TO SUGAR CANE BY-PRODUCTS COMPANY, OF PHILADELPHIA, PENNSYLVANIA, A CORPORATION OF DELAWARE.

METHOD OF TREATING BAGASSE FOR THE RECOVERY OF ITS VALUES.

1,265,694.  Specification of Letters Patent.  Patented May 7, 1918.

No Drawing.  Application filed November 11, 1915.  Serial No. 60,800.

*To all whom it may concern:*

Be it known that I, MARK W. MARSDEN, a citizen of the United States, residing at Philadelphia, in the county of Philadelphia and State of Pennsylvania, have invented certain new and useful Improvements in Methods of Treating Bagasse for the Recovery of Its Values, of which the following is a specification.

This invention has reference to the treatment of bagasse for the recovery of its values.

In treating bagasse particularly for the recovery of its fiber for use in the manufacture of paper and for other purposes, I have discovered that the pith is of considerable value in that when treated according to my invention it produces a sugar syrup or glucose of as good quality, if not better, than that obtained from starch, and at considerably less expense.

My present invention is therefore concerned with the separation and independent recovery of the pith and fiber, and to these ends, resides in the matters hereinafter described and finally claimed.

In practising the invention, I take the bagasse or sugar cane after its discharge from the extractor and pass it through a shredder of any suitable construction in order to reduce it to a uniformly divided fibrous pithy mass. In this state it is subjected to the action of a drier so as to remove all but about say ten per cent., more or less, of the natural moisture. The stock, shredded and dried, as described, is next ground in an attrition mill to such fineness as to break the pith away from the fiber, and the separation of these two elements is then completed for example by screening or blowing.

The pith or cellulose divested of the fiber is ground to about the fineness of flour or starch, and in this powdered state is boiled in water for from one to three hours or for such period as is required to effect the removal or liberation of all objectionable soluble matter. After this step the material is washed and pressed and then reground in its wet state into a paste as fine as desired. The paste is then formed into a liquid by the addition of water. The latter contains a ferment such as, for example, malt or diastase, and is heated to a temperature range of from 130 to 160 degrees F. The purpose of this treatment is to induce fermentation which is completed by the addition of dilute sulfuric acid. For illustrative purposes, to a volume of say two hundred and fifty pounds of paste, I add from fifty to seventy-five gallons of water containing from one to two and a half pounds of sulfuric acid. The mass is then boiled either in an open or closed vessel under sufficient pressure to recover the cellulose in soluble form either as a syrup, glucose or sugar, according to the strength of acid that is employed. The acid of course is neutralized in the usual manner by the addition of carbonate of lime and after settling or precipitation is clarified by filtration through animal charcoal or other suitable material.

The process may then be continued in order to purify the product and for this purpose any of the well known and standard methods may be adopted as in the art of sugar manufacture.

The fiber is boiled either in an open or closed receptacle in the presence of water in order to dissolve and remove the extractive matter, whereupon digesting with an alkali is resorted to so as to remove the incrusting matter and silica and to loosen the fiber. The latter is then reduced to a pulp and subjected to such further and usual steps as are incident to the manufacture of paper.

Having described the nature and objects of the invention, I claim:—

1. The method herein-described, which consists in reducing bagasse to a uniformly divided state, removing all but about ten per cent., more, or less, of the natural moisture content, separating the pith from the fiber and grinding it to substantially the fineness of flour, boiling the ground pith in the presence of water in order to remove objectionable soluble matter, washing and pressing the clear pith and forming it into a paste, and thereafter proceeding as usual for the recovery of glucose.

2. As an article of manufacture, a paste prepared from the separated and purified pith component of bagasse, said pith being ground to substantially the fineness of flour and emulsified with water.

In testimony whereof I affix my signature in the presence of two witnesses.

MARK W. MARSDEN.

Witnesses:
 JOHN L. FLETCHER,
 MARGARET E. DILLER.